July 2, 1963  J. M. PUGH ETAL  3,095,679
CANE CONVEYOR ASSEMBLY FOR HARVESTERS
Filed Oct. 30, 1959  4 Sheets-Sheet 3

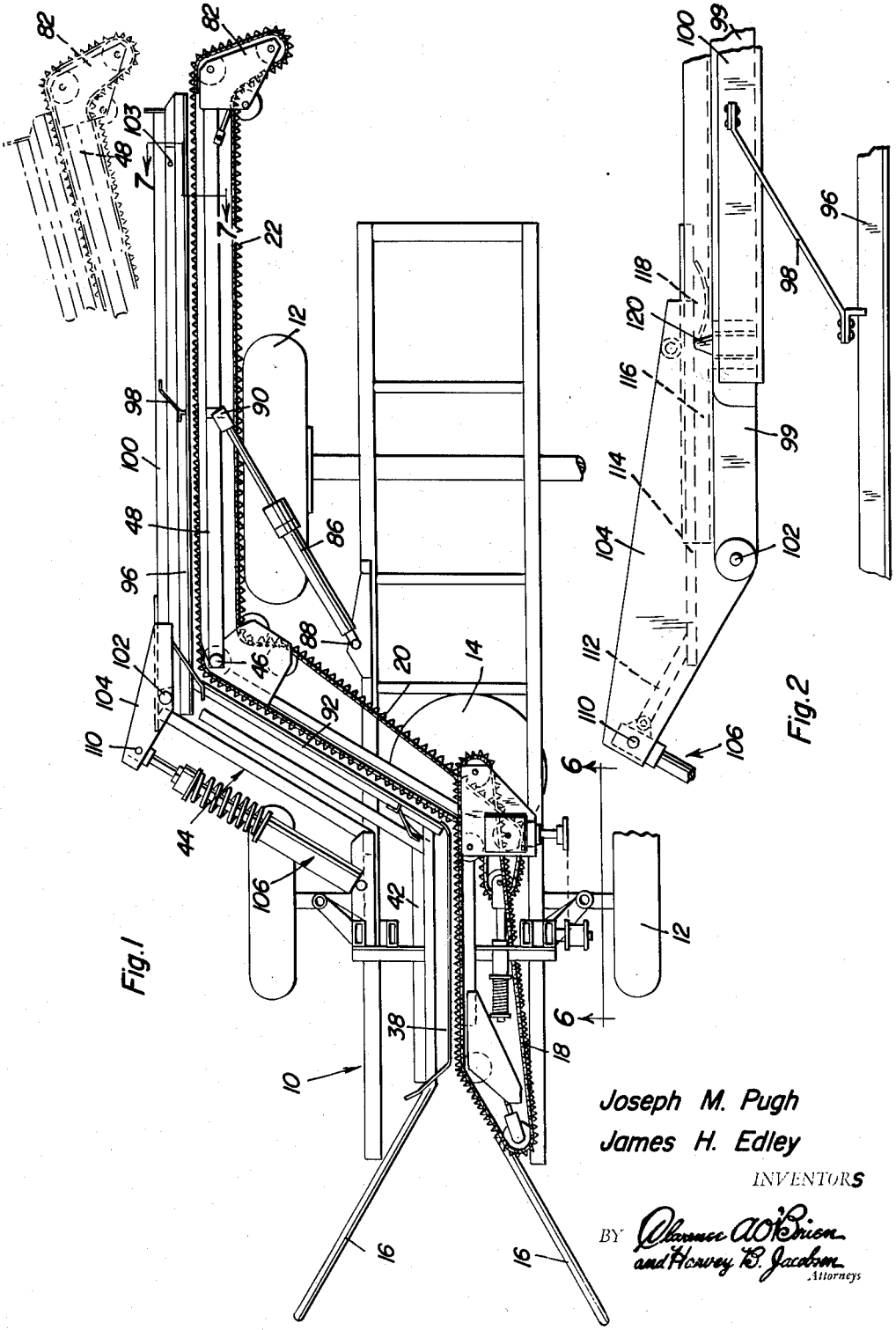

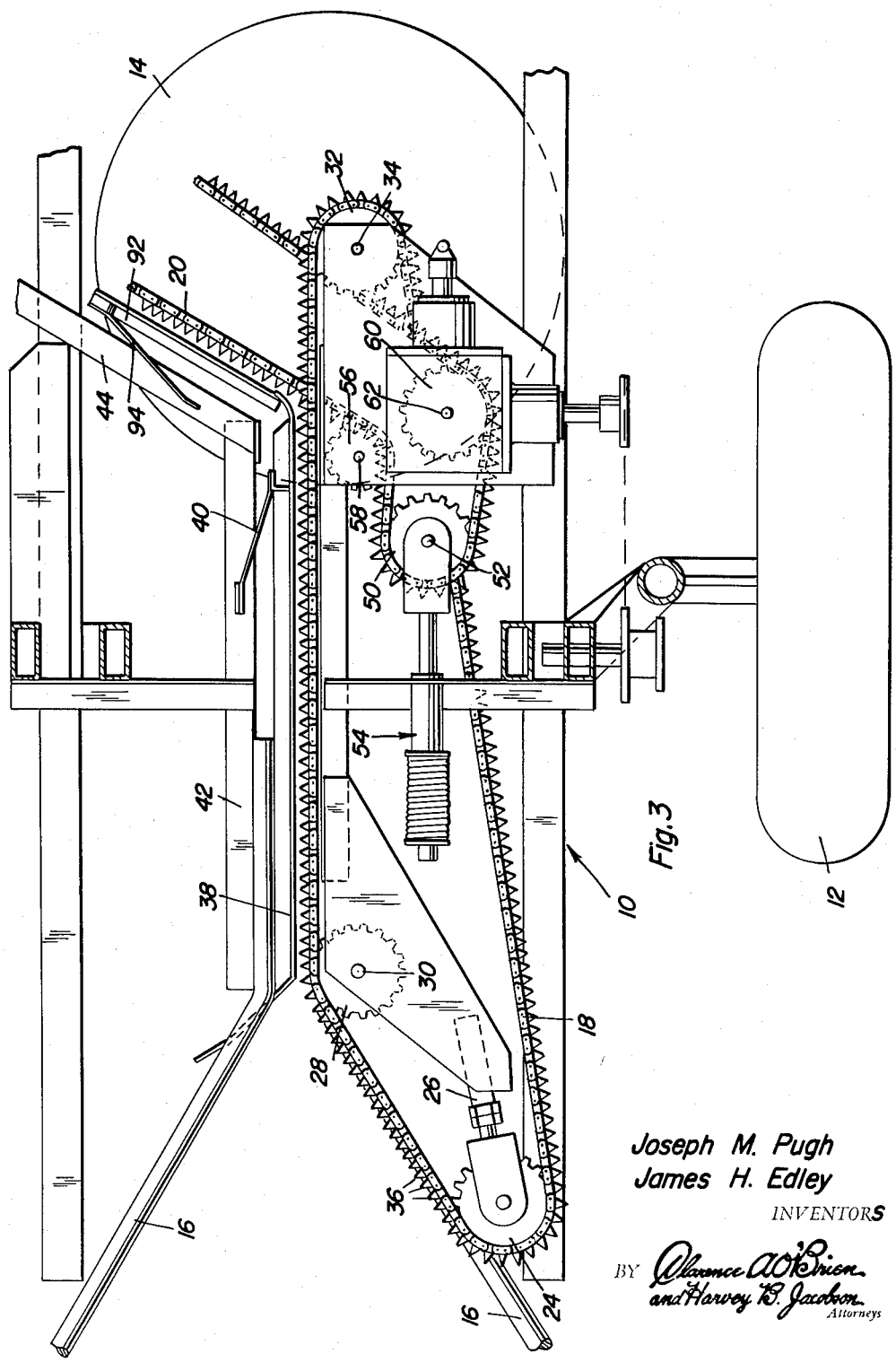
Joseph M. Pugh
James H. Edley
INVENTORS

Joseph M. Pugh
James H. Edley
INVENTORS

July 2, 1963 J. M. PUGH ETAL 3,095,679
CANE CONVEYOR ASSEMBLY FOR HARVESTERS
Filed Oct. 30, 1959 4 Sheets-Sheet 4
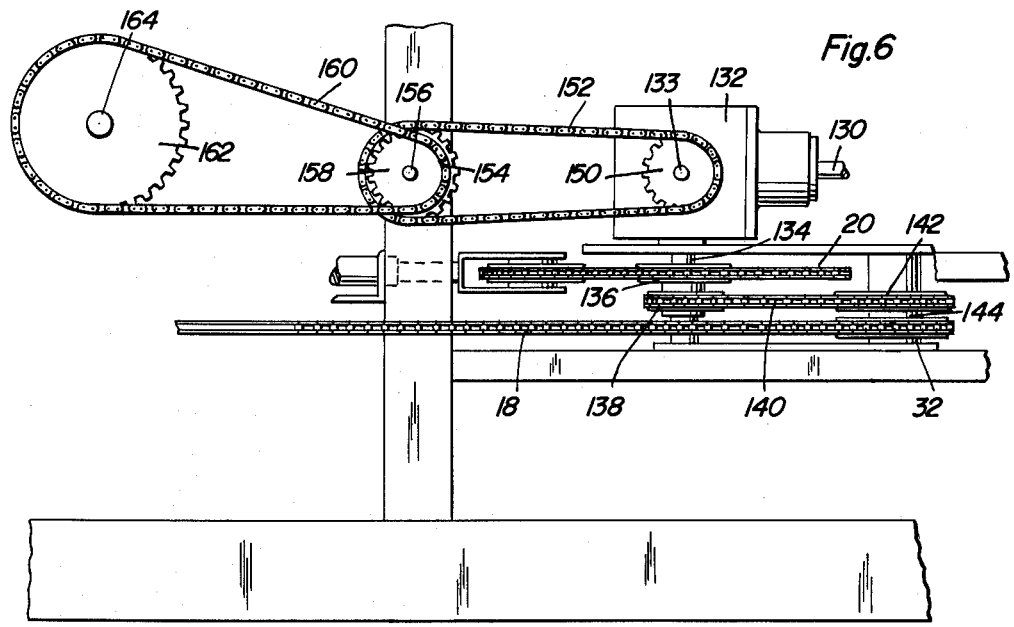
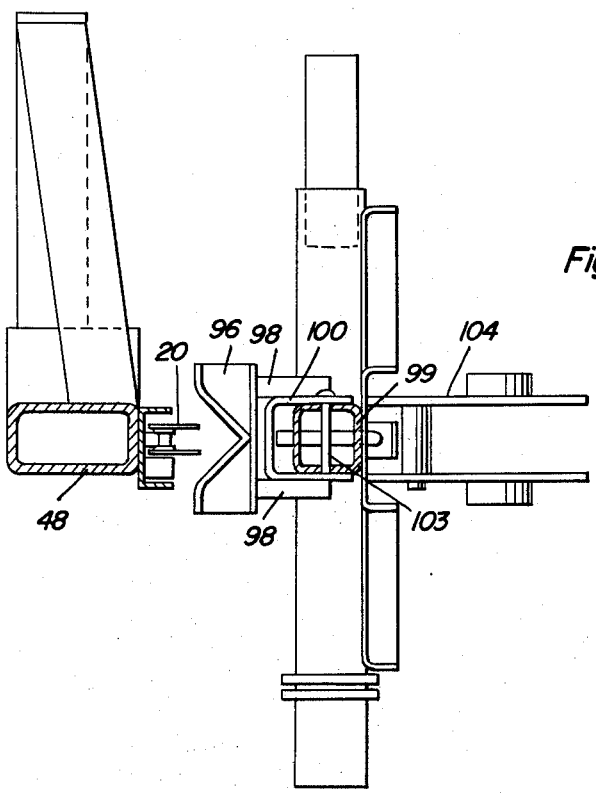
Joseph M. Pugh
James H. Edley
INVENTORS

United States Patent Office 3,095,679
Patented July 2, 1963

3,095,679
CANE CONVEYOR ASSEMBLY FOR HARVESTERS
Joseph M. Pugh and James H. Edley, Jeanerette, La., assignors to J. & L. Engineering Co., Inc., Jeanerette, La., a corporation of Louisiana
Filed Oct. 30, 1959, Ser. No. 849,841
17 Claims. (Cl. 56—15)

This invention comprises a novel and useful cane conveyor assembly for harvesters and while relating generally to the same type of cane harvesting and piling machine as those disclosed in the prior patents of Byron C. Thomson No. 2,427,313 of September 9, 1947, and Joseph M. Pugh, No. 2,669,829 of February 23, 1954, constitutes a novel and improved cane piling mechanism presenting improvements over said prior patents.

In the above mentioned prior patents there are disclosed cane pilers of the type in which a single cane harvester and piler is employed for simultaneously cutting a row of cane as the machine progresses therealong and thereafter windrowing, piling or depositing the cane cut in a plurality of successive rows on a single row or pile, in a manner whereby the cane may be readily handled by conventional loaders. In such apparatuses there is provided a piling arm which is adapted to swing pivotally in a horizontal plane from the side of the apparatus from a position wherein the arm lies longitudinally along the side of the apparatus to a position in which the arm is inclined at an angle up to 60° from the longitudinal axis of the machine in order to thereby deposit the cut cane after the same has been conveyed along the length of the arm to a selected row or heap by suitable discharge means at the end of the piling arm of the apparatus.

It is the primary purpose of this invention to provide a novel and improved piling arm and associated mechanism by which the cane which has been cut by the harvester is conveyed, while being retained in an upright position, rearwardly and outwardly relative to the apparatus as the same progresses along a standing row of cane to be harvested, in order that the cane may be more effectively and with greater precision and certainty deposited in a selected row which is to receive the cane harvested from a number of standing rows of cane.

A further important object of the invention is to provide a cane piling arm and associated mechanism which will afford the maximum security in holding and supporting the cane in an upright attitude during the travel of the same until the cane is discharged from the end of the mechanism onto the selected heap or pile.

A further and more specific object of the invention is to provide a cane conveying assembly for harvesters of the type described and in which the cane piling arm and its associated mechanism shall be so constructed as to have substantially little or no detrimental effect upon its operation as a result of the horizontal swinging adjustment of the mechanism; and wherein compensating means are provided to overcome any such detrimental effect upon the conveying mechanism as may be imparted by the geometry of motion of the horizontally swinging cane piling arm of the apparatus.

Yet another object of the invention is to provide a cane conveyor assembly for harvesters wherein a substantially uniform and even pressure may be applied upon the stalks of cane during the entire travel and conveying of the same through the apparatus.

A further and very important object of the invention is to provide a cane conveying assembly for harvesters wherein there is eliminated the heretofore necessary arched supports by which is supported a pressure rail assembly against a channel in order to retain and convey the standing stalks of cane as they are moved through the apparatus thus obviating heretofore necessary limitations upon the construction of a cane harvesting apparatus.

More specifically an object of the invention is to provide an improved conveyor assembly for supporting in an erect position stalks of cane and conveying them through the apparatus from successive standing rows to a single heap row.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view, parts being broken away and omitted and an alternative position of the piler arm being shown in dotted lines, of a suitable form of apparatus incorporating therein the cane conveyor system of this invention, and which apparatus is of the same general type as that set forth in the prior patent to Joseph M. Pugh No. 2,669,829;

FIGURE 2 is an enlarged detail view in plan of a portion of the forward or pivoted end of the cane piling arm with the resilient mounting of the pressure rail thereon and some of the associated mechanism for the same;

FIGURE 3 is an enlarged fragmentary plan view of the front portion of the apparatus of FIGURE 1, parts of the framework being shown in horizontal section and certain concealed parts being indicated in dotted lines;

Figure 4:
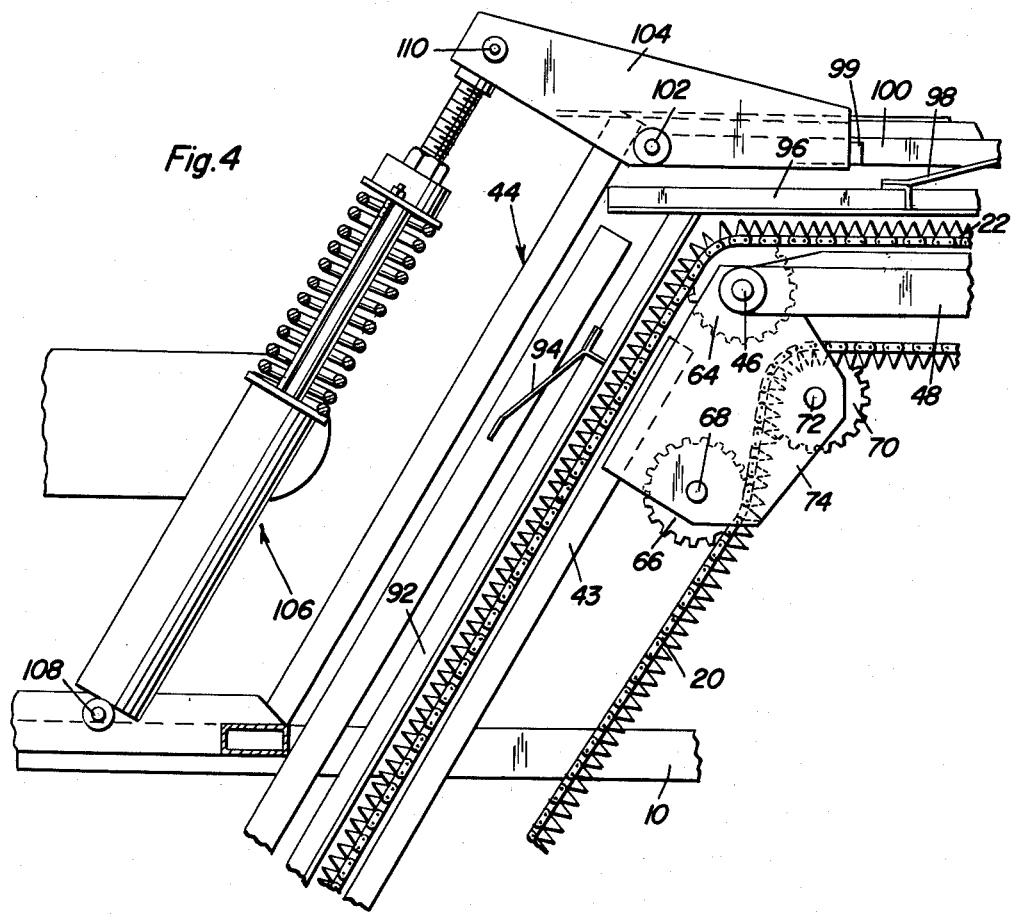
FIGURE 4 is an enlarged view in plane of a portion of the apparatus of FIGURE 1 and showing in particular the association of the resilient pressure means forming a part of the conveying means of the piling arm assembly of the apparatus.

FIGURE 6 is a detail view taken upon an enlarged scale in vertical longitudinal section substantially upon the plane indicated by the section line 6—6 of FIGURE 1 and showing chiefly in side elevation a portion of the power transmitting mechanism of the apparatus with certain parts of the apparatus being omitted; and FIGURE 7 is a detail view taken upon an enlarged scale in vertical transverse section substantially upon the plane indicated by the broken section line 7—7 of FIGURE 1 and showing certain details of the invention.

General Organization

Referring first to FIGURE 1, it will be observed that the numeral 10 designates generally a suitable chassis or framework which is rendered mobile as by wheels 12 to which is connected a suitable power plant, not shown. The power plant may be mounted at the rear or right end of the framework as viewed in FIGURE 1, and may consist of an internal combustion engine or the like by which power is provided both to impart movement to the apparatus and also to operate the harvesting and cane conveying mechanism mounted thereon as set forth hereinafter. Inasmuch as the particular power plant employed is not critical to the principles of this invention, an illustration and description of the same is deemed to be unnecessary for an understanding of the invention as set forth and claimed hereinafter and has been omitted.

The apparatus is provided with any conventional means for steering the same in order that it may travel along the rows of stalks to be cut, harvested, and piled thereby. It may be here noted that the apparatus will include such conventional elements as are required for a stalk harvester, as for example the rotary cutter of knife blade 14 which is suitably driven by the power plant and mounted for rotation about a vertical axis at the forward portion of the apparatus as suggested in FIGURE 1.

Further provided at the forward end of the apparatus and disposed symmetrically with respect to the longitudinal center line thereof are a pair of forwardly divergent guide arms 16 which are so positioned that upon forward travel of the apparatus along a row of cane or the like the standing stalks will be guided by means of arm 16 into a position in which they will be engaged by the conveying portion of the apparatus and by the rotary cutter 14.

In order to transport the stalks of cane and retain them in an erect or standing position during their passage through the apparatus and their final deposition upon a heap pile rearwardly of the apparatus there is provided a conveying system of conveyor chains together with a horizontally swinging piling arm. The apparatus further includes power operating means by which the necessary horizontal swinging movement is imparted to the piling arm and to its rear discharge means and a driving means for the cutter blade and the conveyor assembly.

*Conveyor Assembly*

Figure 5:
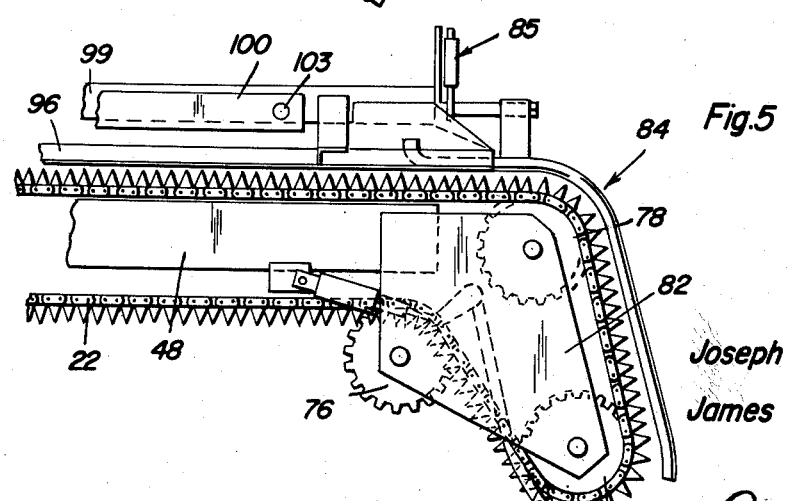
FIGURE 5 is a detail view taken in plan and upon an enlarged scale of the rearward portion or discharge end of the cane piling arm and the pressure rail assembly of the apparatus.

The conveyor assembly, as shown in its entirety in FIGURE 1 and in its details in FIGURES 3-5, consists of two chain conveyors each mounted for travel in a horizontal plane. These two chain conveyors include a forward or first conveyor chain 18 and a second conveyor chain 20 which extends laterally and rearwardly from the rear end of the forward chain 18 to the side of the apparatus and then along the latter to the rear discharge means thereof. Although it is mechanically possible to provide separate chain conveyor assemblies for the lateral and rearward portions of the second conveyor chain 20, it is preferred, as illustrated in the drawings to provide a single conveyor chain and associated mechanism for this purpose.

The first and second conveyor chains 18 and 20 lie in different, vertically spaced horizontal planes, as will be apparent from the showing of their adjacent ends and their drive means in FIGURE 6.

Referring now to FIGURE 3 it will be observed that the forward conveyor chain 18 is entrained about a forward sprocket 24 provided with an adjustable support designated by the numeral 26 whereby tension may be adjusted in this chain together with an idler sprocket 28 suitably journalled upon an axle 30 and a rear driving sprocket 32 which is mounted upon the axle 34. The forward chain 18 is closely adjacent the convergent rear ends of the convergent guide arms 16 so that stalks or standing cane will be guided into contact with the laterally projecting teeth 36 which each of the chains is equipped. These conveyor teeth are adapted to come into close juxtaposition or contact with a longitudinally extending pressure rail assembly.

The pressure rail assembly for the first chain includes a pressure rail 38 carried by suitable spring support members 40 which yieldingly urge the rail towards the chain, it being understood that the pressure rail and its resilient support members are in turn carried by a frame member 42 forming a part of or mounted upon the chassis or framework 10 of the apparatus. The arrangement is such that as the machine moves forward along a row of standing stalks, the latter will be guided by the members 16 into the narrow opening lying between the forward conveyor chain 18 and the pressure rail 38 so that the individual stalks will be received in the pockets lying between the chain teeth 36 and resiliently held therein by the pressure rail 38. Thus as the device moves forward and the chain moves rearwardly at the same rate of travel, the stalks will progressively pass along the slots through the center of the machine, emerging from the rearward end of the first conveyor chain. Just as they reach the rearward end of the latter, they are engaged by the rotary cutter 14 and severed adjacent the ground and then, being supported and retained in their erect position, they pass from the rearward end of the first conveyor chain and are engaged by the second conveyor chain 20 and are then moved first transversely and then rearwardly by the lateral and rearward sections of the second chain.

Referring now especially to FIGURE 1, it will be seen that the second conveyor chain 20 is carried by a number of sprockets and convey the severed stalks in their upright position first laterally of the vehicle from the rearward end of the front conveyor chain to one side of the vehicle and from thence along the length of the adjustable piling arm of the apparatus in a manner to be subsequently set forth, and from which the stalks are discharged and piled in a selected row.

The second conveyor chain 20 is rotatably supported upon a fixed lateral support frame 43 and the beam 48 of the piler arm which is pivoted to the lateral support frame by a vertical pivot 46, and the chain 20 is directly supported by means of a plurality of sprockets. Thus, as shown in FIGURE 3, there is provided a forwardmost sprocket 50 mounted upon a vertical axle or pivot 52 and provided with a resilient support structure as at 54 by which tension is imparted to the chain for taking up slack therein. There are further provided a forward idler sprocket 56 carried by a vertical axle 58 and a driving sprocket 60 having a driving axle 62 therefor to which power is imparted in a manner to be subsequently set forth.

Referring now more specifically to FIGURE 4 it will be observed that the second conveyor chain 20 is then entrained over idler sprockets 64 journalled upon the previously mentioned pivot 46 of the piler arm beam 48 and also about an idler sprocket 66 having a pivot 68 and a further idler sprocket 70 having a pivot 72. It will be observed that a mounting plate 74 on the lateral support frame 43 serves to support the pivots 46, 68 and 72 as shown in FIGURE 4.

Referring next to FIGURE 5 it will be observed that the rearward end of the second chain 20 is entrained over idler sprockets 76, 78 and 80, these being each carried by a support plate 82 secured to the rearward end of the piler arm beam 48. Suitable adjustable deflector mechanism indicated generally by the numeral 84 in FIGURE 5 and actuated in any suitable manner as by a hydraulic cylinder and piston unit 85 is employed for deflecting the cane selectively to one side or the other of the main piling arm, but inasmuch as the invention claimed herein is not restricted to any particular type of such mechanism and since a suitable form of this mechanism is fully disclosed in the prior patent of Joseph M. Pugh, No. 2,669,829, a further description of the same is deemed to be unnecessary herein.

It will be observed that the various idler pulleys previously mentioned serve to support the single second conveyor chain 20 in order that its forward or lateral section extending along the lateral support frame 43 may receive the stalks of cane from the forward chain assembly 18, convey the stalks laterally of the machine and then the rearward section of chain 20 will convey the stalks longitudinally along the main piler arm for discharge from the rear end thereof to either side by the rear discharge deflector mechanism 84.

At this point it should be observed from FIGURE 1 that there is provided a hydraulic or other fluid pressure actuated cylinder and piston assembly designated by the numeral 86 which is of any conventional design, having one end thereof pivoted as at 88 to the chassis 10 and having its other end pivoted as at 90 to the beam 48 of the piler arm. By the application of fluid pressure to the unit 86 by any suitable mechanism, not shown, the beam 48 may be caused to swing horizontally about its vertical pivot or axle 46 for the purpose of discharging the cane from the rearward end thereof at selected positions with respect to the longitudinal axis of the machine. The purpose of this operation is to cause the cane from successive rows along which the apparatus passes to be deposited upon the same single heap row as has been clearly set forth and described in the prior patent to Pugh above mentioned and a further description of this phase of the operation of the mechanism is therefore believed to be unnecessary.

Pressure rails similar to that described in connection with the first chain conveyor 18 are employed for the second chain conveyor 20 along both its lateral and longitudinal sections. Thus, as shown in FIGURES 3 and 4 in particular, a pressure rail 92 is provided for the lateral section of the conveyor chain 20, it being mounted by resilient supports 94 from the lateral support frame 44 previously mentioned. This pressure rail, being yieldingly urged towards the adjacent chain, yieldingly holds the stalks in the teeth 36 of the conveyor chain in order that the stalks may be conveyed laterally and rearwardly after they are received from the first conveyor chain section 18 until they are delivered to the longitudinal section of the conveyor chain 20 mounted upon the piler arm.

*Piler Arm*

As shown in greater detail in FIGURES 2, 4 and 5, there is associated with the rearward portion of the conveyor chain assembly 18, the forward and longitudinal portions of the conveyor chain assembly 20 which is carried by and completely encircles the piler arm beam 48. Since both the piler arm beam 48 and the sprocket or pulley 64 of the second conveyor chains 20 have a common vertical axis or pivot by the member 46, both the arm and the rear or longitudinal section of the chain 20 may be horizontally adjusting without interfering with the operation of the second conveyor chain 20.

The piler arm beam 48 is supported solely by the pivot means 46 at its forward end and its swinging movement is caused and controlled by the single power operator 86 as previously described.

The assembly which makes up the piler arm comprises the previously described beam 48 with the rearward section of the second conveyor chain 20 mounted thereon, the rear discharge or deflector assembly 84, a pressure rail assembly and a pressure rail spring assembly 106 to be now described.

A support arm 99, see FIGURES 4 and 5, has thereon an elongated channel-shaped member or support bar 100. The front end of the support arm 99 is pivoted to the lateral support frame 44 by a vertical pivot pin 102 while the support bar 100 is pivoted at its rear end to the support arm at 103. The support bar carries the pressure rail 96 by the resilient spring supports 98. The pressure rail 96, being spring urged towards the longitudinal section of the second conveyor chain 20, yieldingly holds in the teeth 36 of the latter the erect cane stalks which are passed thereto from the forward portion of the chain 20 and the pressure rail 92, see FIGURE 4.

A support bracket 104, see FIGURES 2 and 4 is rigidly and fixedly secured to the support arm 99 and constitutes the means by which the latter is attached to the pivot pin 102.

At this point it should be observed that the vertical axes of the members 102, 46 and 72 lie in a common vertical plane which is inclined at an angle of 45° to the longitudinal axis of the chassis framework 10 of the apparatus.

Shown best in FIGURE 4 is the spring assembly 106 by means of which a constant resilient pressure is applied to the support arm for urging the support arm, support bar and the pressure rail towards the piler arm beam 48 and likewise urging the latter towards the framework 10. The spring assembly is a longitudinally extensible resiliently urged device of any suitable type, being pivoted at 108 to the framework 10 and to the support bracket 104 at 110.

Since the support arm 99 and the piler arm beam 48 pivot about different axes at 46 and 102 it will be evident that the distance between the arm 99 and beam 48 will vary during such joint horizontal swinging movement. The present invention therefore provides an automatic compensating device to retain an approximately constant distance and thus a uniform pressure of the pressure rail upon the cane stalks engaged thereby. This compensating means, shown in FIGURE 2, operates to pivot the support bar 100 about its pivotal connection with the support arm 99 at 103.

Journaled on the pivot 110 is one end of a compensating arm 112 whose other end is rigidly secured to or is integrally joined to one end of a connecting member 114 having a cam plate 116 rigidly carried thereby. The cam plate has a curved cam surface 118 which slidably engages a pin 120 fixedly carried by the support arm 99.

Since the compensator 112, 114 and 116 turn about the axis of pin 110 which is displaced from the axis of the pin 102 about which the support arm 99 turns, there is a relative longitudinal sliding movement between the cam member 116 and the support arm 99 during their joint horizontal swinging. Consequently the cam surface 118 during this horizontal swinging will move the pin 120 and thereby cause the support bar 100 to pivot on the support arm about the pin 103 thereby adjusting the pressure of the spring 98 in the pressure rail 96 whereby to maintain the aforementioned constant pressure.

The pivot points 102, 110 and 108 are so located that an approximately equal or constant force is applied to the arm 99 in all positions of the latter.

*Driving Mechanism*

Reference is now made particularly to FIGURE 6 for an understanding of the manner in which power is applied to the mechanism of the harvester and piler. Power is obtained from the previously mentioned source of power (not shown) it being delivered as by an input shaft 130 to a gear box 132. The latter has a horizontally extending output shaft 133 and a vertically depending output shaft 134 with upper and lower sprockets 136 and 138 thereon. The upper sprocket 136 drives the second section 20 of the lateral and rearward conveyor chain assembly, while the lower sprocket 138 drives through a chain 140 the upper sprocket 142 on a vertical shaft 144 having a lower sprocket 132 thereon which was previously mentioned. This lower sprocket drives the first conveyor chain 18 as previously set forth.

The horizontal power take-off shaft 133 has a driving sprocket 150 which through a sprocket chain 152 and sprocket 154 transmits power to a shaft 156. The latter, through sprocket 158 and chain 160 drives through sprocket 162 and shaft 164 the mechanism of a gathering conveyor, not shown, which moves the standing stalks of uncut cane along the arms 16 to the first conveyor chain 18.

It will thus be seen that a compact drive is provided for the conveyor chains thereby facilitating access to the same for servicing or repairs as is necessary.

What is claimed as new is as follows:

1. In a cane harvesting and piling machine having a frame,
    (a) a horizontally extending cane piling arm having a front end and a rear discharge end,
    (b) means pivotally mounting said arm at its front end upon said frame for swinging movement in a horizontal plane to thereby adjust said discharge end laterally of said frame,
    (c) cane conveying means supported by and projecting laterally from the side of said frame and arm and having laterally projecting holding elements for conveying the stalks of cane while individually gripped and held in a vertical position rearwardly and laterally of the machine and then longitudinally and rearwardly of said arm to said discharge end,
    (d) presser means upon said frame and arm fixed against longitudinal movement relative to said frame and arm and including a member having a smooth, flat presser surface opposed to and cooperating with said holding elements and disposed along the side of said conveying means for resiliently pressing stalks of cane against the holding elements of the latter, (e) means pivotally mounting said presser means upon said frame for swinging movement in a horizontal plane about a vertical axis which is displaced from the pivotal axis of said arm.

2. The combination of claim 1 including, (f) resilient means connected to said frame and to said presser means and yieldingly urging the presser means towards said arm and the latter toward said frame.

3. The combination of claim 2 including, (g) power operating means connected to said frame and said piling arm and disposed therebetween for effecting horizontal swinging movement of said piling arm.

4. The combination of claim 1 wherein said cane engaging means comprises, (f) first and second conveyor assemblies disposed in vertically spaced horizontal planes, (g) the first conveyor having a discharge end which is in overlapping relation with said second conveyor for transferring stalks therebetween.

5. The combination of claim 1 wherein said cane conveying means includes an endless conveyor chain rotatably supported upon pulleys journaled upon said frame and piling arm, (f) one of said pulleys being journaled for rotation about the axis of said arm pivotal mounting means.

6. The combination of claim 1 wherein said mounting means comprises the sole support of said piling arm.

7. The combination of claim 1 including (f) a compensating means connected to said presser means and to said piling arm for maintaining said presser means at a uniform distance from said piling arm during horizontal swinging movement of the latter.

8. The combination of claim 1 wherein said cane conveying means includes first and second sections, said presser means including first and second presser rail assemblies associated with said first and second sections respectively.

9. A cane harvester and piler comprising (a) an elongated mobile frame adapted for movement along rows of cane for cutting and harvesting the same, (b) a piler arm having a pivoted front end and a rear discharge end, (c) means pivotally mounting said piler arm at its pivoted end upon said frame for horizontal swinging movement about a vertical axis towards and from said frame, (d) cutting means mounted on said frame for cutting standing stalks of cane, (e) an endless conveyor chain for conveying stalks after severing by said cutting means in a standing position to said discharge end, (f) pulleys journalled on said frame and arm for rotatably mounting said endless conveyor chain, (g) a support means disposed at one side of said piler arm and the conveyor chain thereon, (h) a vertical pivot means connecting one end of said support means to said frame for horizontal swinging movement of said support means relative to said piler arm, (i) a presser rail movably mounted upon said support means and disposed in side-by-side opposed relation to said conveyor chain, (j) resilient means connected to said support means and to said presser rail and yieldingly urging the latter towards said conveyor chain, (k) means connected to said frame and to said support means and yieldingly urging the latter and said presser rail towards said conveyor chain.

10. The combination of claim 9 including (l) an elongated member carried by and pivotally connected to said support means at the rear end of each, (m) said resilient means being connected to said elongated member and to said presser rail.

11. The combination of claim 10 including (n) compensating means operatively connected to said support means and to said means connected to said frame and to said support and operable upon horizontal swinging of said piler arm and support means for maintaining a controlled spacing therebetween.

12. In a cane harvesting and piling machine including a frame, (a) a piler arm having forward and rearward ends, (b) a vertical pivot connecting the forward end of said piler arm to said frame for horizontal swinging movement, (c) an endless conveyor chain rotatably mounted upon said piler arm for conveying standing stalks of cane along said arm to said rearward end, (d) an elongated pressure rail disposed in side-by-side and opposed relation to said piler arm and conveyor chain, (e) mounting means carrying said pressure rail, (f) a vertical pivot means connecting said mounting means to said frame, (g) resilient means engaging said frame and said mounting means for yieldingly urging said pressure rail towards said chain.

13. In a cane harvesting and piling machine including a frame, (a) a piler arm having forward and rearward ends, (b) a vertical pivot connecting the forward end of said piler arm to said frame for horizontal swinging movement, (c) an endless conveyor chain rotatably mounted upon said piler arm for conveying standing stalks of cane along said arm to said rearward end, (d) an elongated pressure rail disposed in side-by-side and opposed relation to said piler arm and conveyor chain, (e) mounting means carrying said pressure rail, (f) a vertical pivot connecting said mounting means to said frame, (g) resilient means engaging said frame and said mounting means for yieldingly urging said pressure rail towards said chain, (h) a support arm connected to said last mentioned pivot, (i) a support bar disposed along side said support arm and pivoted to the rear end of the latter, (j) means supporting said pressure rail upon said support bar.

14. The combination of claim 13 wherein the last mentioned means comprise spring members.

15. In a cane harvesting and piling machine including a frame, (a) a piler arm having forward and rearward ends, (b) a vertical pivot connecting the forward end of said piler arm to said frame for horizontal swinging movement, (c) an endless conveyor chain rotatably mounted upon said piler arm for conveying standing stalks of cane along said arm to said rearward end, (d) an elongated pressure rail disposed in side-by-side and opposed relation to said piler arm and conveyor chain, (e) mounting means carrying said pressure rail, (f) a vertical pivot connecting said mounting means to said frame, (g) resilient means engaging said frame and said mounting means for yieldingly urging said pressure rail towards said chain, (h) a support arm connected to said last mentioned pivot, (i) a support bar disposed alongside said support arm and pivoted to the rear end of the latter,
(j) means supporting said pressure rail upon said support bar,
(k) compensating means connected to said frame and to said mounting means for maintaining a uniform spacing of said pressure rail and frame.

16. The combination of claim 15 wherein said compensating means is pivotally connected to the first mentioned vertical pivot.

17. The combination of claim 16 wherein said compensating means includes a cam plate with a cam surface thereon and a cam follower on said support bar engaging and operated by said cam surface.

References Cited in the file of this patent

UNITED STATES PATENTS

| | | |
|---|---|---|
| 2,590,758 | Dahlman | Mar. 25, 1952 |
| 2,669,829 | Pugh | Feb. 23, 1954 |
| 2,803,463 | Congelli | Aug. 20, 1957 |
| 2,809,741 | Keilig | Oct. 15, 1957 |
| 2,973,816 | Van der Lely et al. | Mar. 7, 1961 |